United States Patent
Nevitt

(10) Patent No.: US 10,295,158 B2
(45) Date of Patent: *May 21, 2019

(54) LIGHT REPLACING APPARATUS FOR REPLACING BULBS IN STREET LAMPS

(71) Applicant: Thomas Nevitt, Dallas, TX (US)

(72) Inventor: Thomas Nevitt, Dallas, TX (US)

(*) Notice: Subject to any disclaimer, the term of this patent is extended or adjusted under 35 U.S.C. 154(b) by 64 days.

This patent is subject to a terminal disclaimer.

(21) Appl. No.: 15/451,140

(22) Filed: Mar. 6, 2017

(65) Prior Publication Data

US 2017/0248292 A1    Aug. 31, 2017

Related U.S. Application Data

(63) Continuation of application No. 14/506,467, filed on Oct. 3, 2014, now Pat. No. 9,587,809.

(60) Provisional application No. 61/886,777, filed on Oct. 4, 2013.

(51) Int. Cl.
| | |
|---|---|
| *F21S 8/08* | (2006.01) |
| *F21V 19/04* | (2006.01) |
| *F21V 23/00* | (2015.01) |
| *F21V 21/116* | (2006.01) |

(52) U.S. Cl.
CPC .............. *F21V 19/04* (2013.01); *F21S 8/085* (2013.01); *F21V 21/116* (2013.01); *F21V 23/001* (2013.01); *Y02B 20/72* (2013.01); *Y10T 29/4973* (2015.01)

(58) Field of Classification Search
CPC ........ F21V 19/04; F21V 21/116; F21V 21/36; F21S 8/085; F21S 8/088
See application file for complete search history.

(56) References Cited

U.S. PATENT DOCUMENTS

| | | |
|---|---|---|
| 1,977,105 A | 10/1934 | Wood |
| 2,046,840 A | 7/1936 | Phillips |
| 3,355,847 A | 12/1967 | Pratt |
| 3,679,891 A | 7/1972 | Quack |
| 4,242,726 A | 12/1980 | Steadman |
| 4,272,802 A | 6/1981 | Steadman |

(Continued)

OTHER PUBLICATIONS

PCT: International Search Report and Written Opinion of PCT/2014/059204 (related application); dated Mar. 13, 2015; 11 pgs.

*Primary Examiner* — Anh T Mai
*Assistant Examiner* — Zachary J Snyder
(74) *Attorney, Agent, or Firm* — Gregory M. Howison

(57) ABSTRACT

A method for changing a light bulb in a parking light pole, comprising disposing a housing on the top of a light pole for holding a lamp holder having a lamp disposed therein, holding the lamp holder in the housing by urging the lamp holder downward, removing the lamp holder by urging a removal apparatus up through an annulus in the center of the light pole to urge a plurality of pivoting members outward and away from the bottom surface of the lamp holder to allow the lamp holder to fall and be captured by the removal apparatus, replacing the lamp holder by disposing the lamp holder in an installation device, urging the installation device upward such that the lamp holder causes the pivoting members to urge outward, urging the installation device down in the annulus to allow the lamp holder to be urged downward, and removing the installation device.

14 Claims, 6 Drawing Sheets

FIG. 13A

(56) References Cited

U.S. PATENT DOCUMENTS

| | | |
|---|---|---|
| 4,392,192 A | 7/1983 | Steadman |
| 4,797,798 A | 1/1989 | Schumaker et al. |
| 5,031,085 A | 7/1991 | Rustin |
| 5,329,437 A | 7/1994 | Briggs |
| 5,628,558 A | 5/1997 | Iacono et al. |
| 5,765,453 A | 6/1998 | Mims |
| 6,224,233 B1 | 5/2001 | Fischer et al. |
| 6,447,150 B1 | 9/2002 | Jen et al. |
| 7,334,503 B1 | 2/2008 | Newman |
| 8,038,330 B2 | 10/2011 | Liu |
| 8,869,655 B2 | 10/2014 | Johnson et al. |
| 9,091,416 B1 | 7/2015 | Olsson et al. |
| 2002/0181239 A1 | 12/2002 | Simon |
| 2004/0012969 A1* | 1/2004 | Sin .................... F21V 21/36 362/384 |
| 2006/0290152 A1 | 12/2006 | Robinson |
| 2009/0261225 A1 | 10/2009 | Chen et al. |

* cited by examiner

LIGHT REPLACING APPARATUS FOR REPLACING BULBS IN STREET LAMPS

CROSS-REFERENCE TO RELATED APPLICATIONS

This application is a continuation of U.S. patent application Ser. No. 14/506,467, filed Oct. 3, 2014, entitled LIGHT REPLACING APPARATUS FOR REPLACING BULBS IN STREET LAMPS, published as U.S. Patent Application Publication No. 2015/0098232, which application Ser. No. 14/506,467 claims benefit of U.S. Provisional Application No. 61/886,777, filed Oct. 4, 2013, entitled LIGHT REPLACING APPARATUS FOR REPLACING BULBS IN STREET LAMPS, the specifications of which are incorporated herein in their entirety.

TECHNICAL FIELD

The present invention pertains in general to lighting apparatuses, and more particularly to a technique for replacing a bulb on a high lamp pole.

BACKGROUND

Light poles have lamps that are between 20 and 30 feet from the ground. In order to change a lamp, which sometimes might be changed once or twice a year, it is necessary to rent a "cherry picker" and then raise the individual up to the level of the lamp to gain access thereto. This can be quite expensive if a single bulb has to be replaced, and one waits for multiple bulbs to be replaced in order to rent the equipment.

BRIEF DESCRIPTION OF THE DRAWINGS

For a more complete understanding, reference is now made to the following description taken in conjunction with the accompanying Drawings in which.

DETAILED DESCRIPTION

Figure 1:
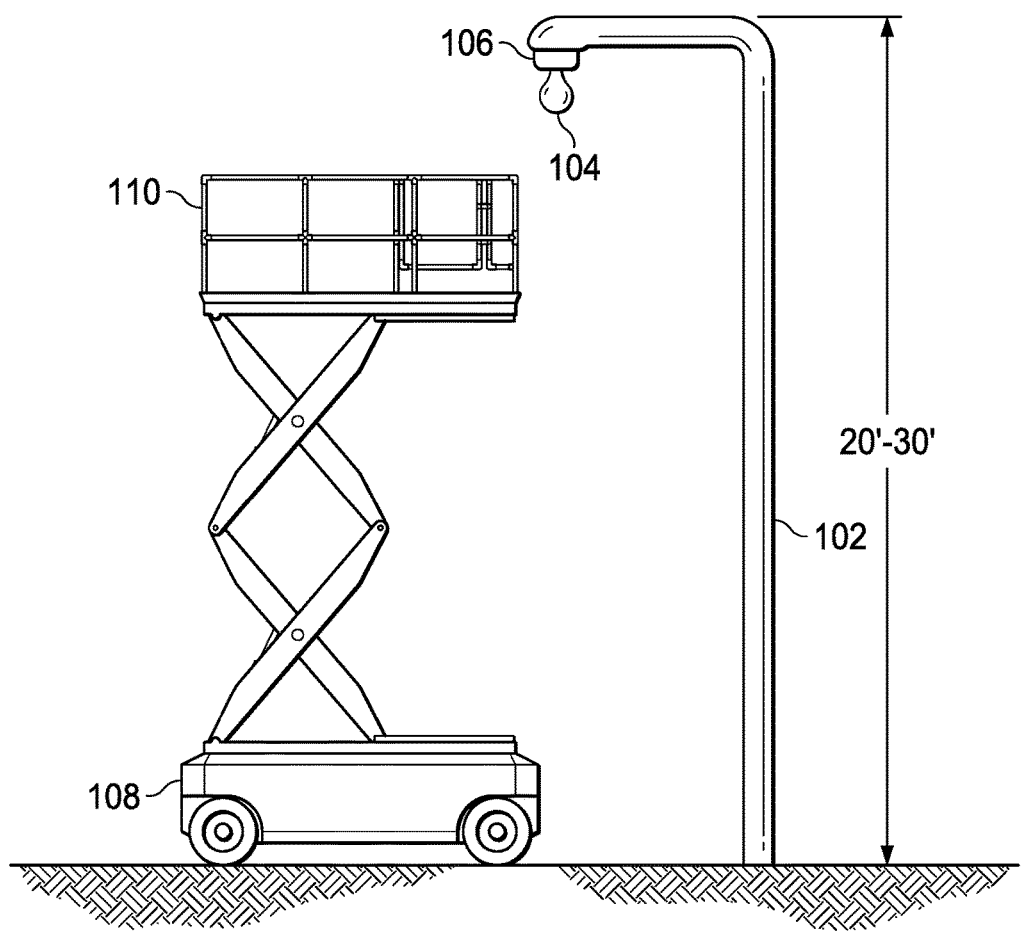
FIG. 1 illustrates a diagrammatic view of a prior art method for installing light poles.

Referring now to the drawings, wherein like reference numbers are used herein to designate like elements throughout, the various views and embodiments of a light replacing apparatus for replacing bulbs in street lamps are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to FIG. 1, there is illustrated a prior art installation method for a lamp. Illustrated is a lamp pole 102 with a lamp 104 disposed on the upper end thereof. This lamp pole 102 is between 20 and 30 feet in height. In order to change the lamp, which is illustrated in a detail where the bulb 104 is disposed within a holder 106, some type of machine such as a cherry picker or an elevator 108 is required. The elevator has a box 110 disposed on the top thereof that can be elevated high enough for an individual sitting in the box 110 to change the bulb 104. This requires the renting of the elevator 108 or a cherry picker to change a single bulb. If multiple lamp poles are provided in a parking lot, for example, and only a single bulb goes out, it is not cost-efficient to change such.

Figure 2:
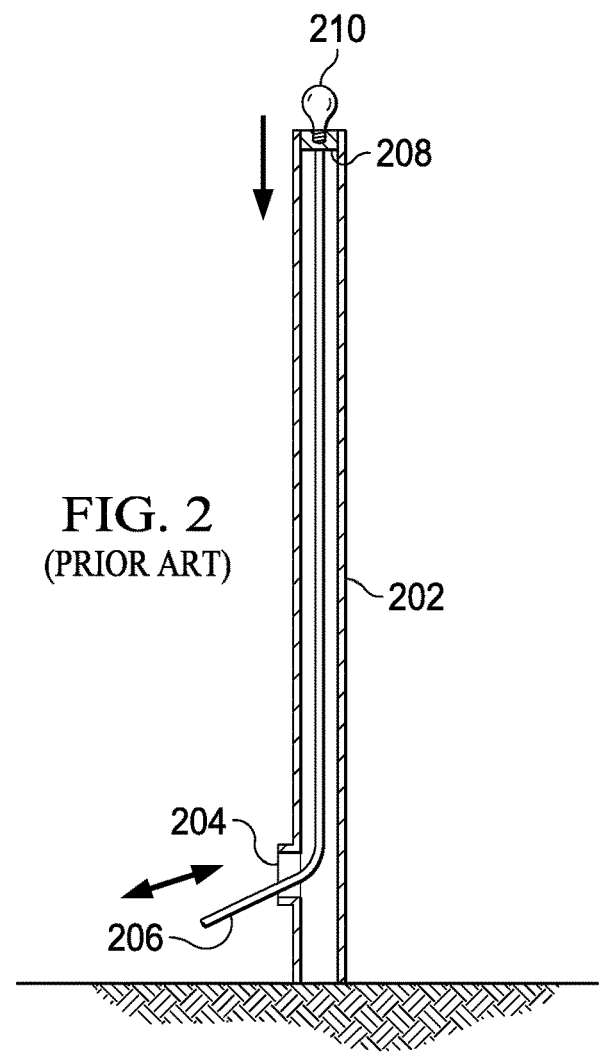
FIG. 2 illustrates a general diagram of the use of the bulb replacement device of the present embodiment.

Referring now to FIG. 2, there is illustrated a diagrammatic view of an embodiment of the present disclosure. A lamp pole 202 is provided, illustrating that there is an access hole 204 disposed on the lower side thereof. A flexible fiberglass rod 206 can be inserted upward into the lamp pole all the way to the top to access a lamp holder 208. As will be described herein below, this lamp holder 208 is utilized to hold a bulb 210, which can be inserted into the holder 208 with the flexible fiberglass rod 206, or extracted therefrom. This enables an individual to replace a bulb by removing the bulb with the fiberglass rod and then inserting another bulb therein without the need for rental of expensive equipment.

Figure 3:
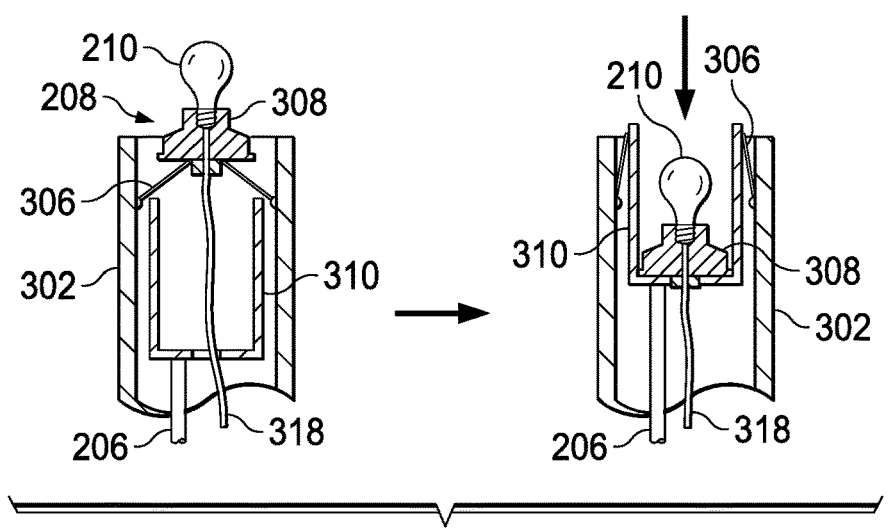
FIG. 3 illustrates a cross-sectional detail of the operation of removing a bulb with the apparatus of the present embodiment.

Referring now to FIG. 3, there is illustrated a diagrammatic view of the embodiment of FIG. 2. A housing 302 is provided that is disposed at the upper end of the lamp pole and comprises the housing 208 in FIG. 2. This housing has disposed therein some cantilevered members 306 that are operable to swivel into position. There is provided a removal lamp holder 308, which can be pushed upward through the members 306, which pivot out of the way and then will fall into place and support the lamp holder 308 on the lower surface thereof. The bulb and lamp holder 308 can be removed by pushing an extraction apparatus 310 upward into the opening in the housing 302 and upward, which will cause the pivoting members 306 to move upward, while the lamp holder 308 is also moved upward such that the edges of the lamp holder 308 will clear the distal edges of the pivoting members 306. This allows the lamp holder 308 to fall down into the extraction apparatus 310, and then be extracted therefrom by pulling the fiberglass rod downward. In general, the holder 308 is held there by gravity. An electrical cord 318 extends downward from the lamp 210 through the holder 308.

Figure 4:
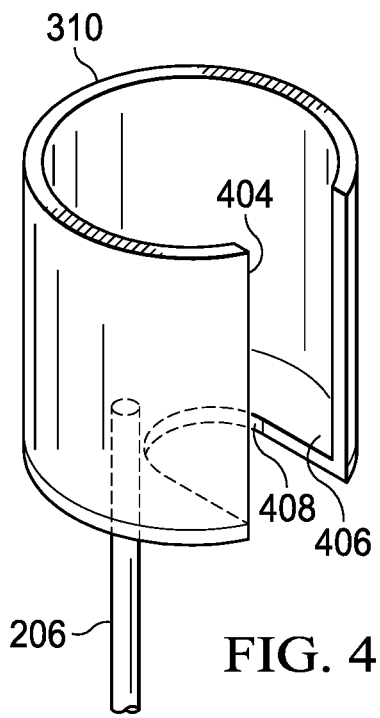
FIG. 4 illustrates a detail of the removal device.

Referring now to FIG. 4, there is illustrated a detail of the extraction device. This is basically a circular member having a slot 404 disposed in one side thereof to allow the extraction device 310 to be disposed about the cord 318. There is a base 406 on the bottom thereof which has a circular cutout 408 disposed therein to receive the cord. The outer surfaces of the housing 310 will substantially coincide with the circular construction of the housing 302. The flexible rod 206 extends upward and attaches to the base 406.

Figure 5:
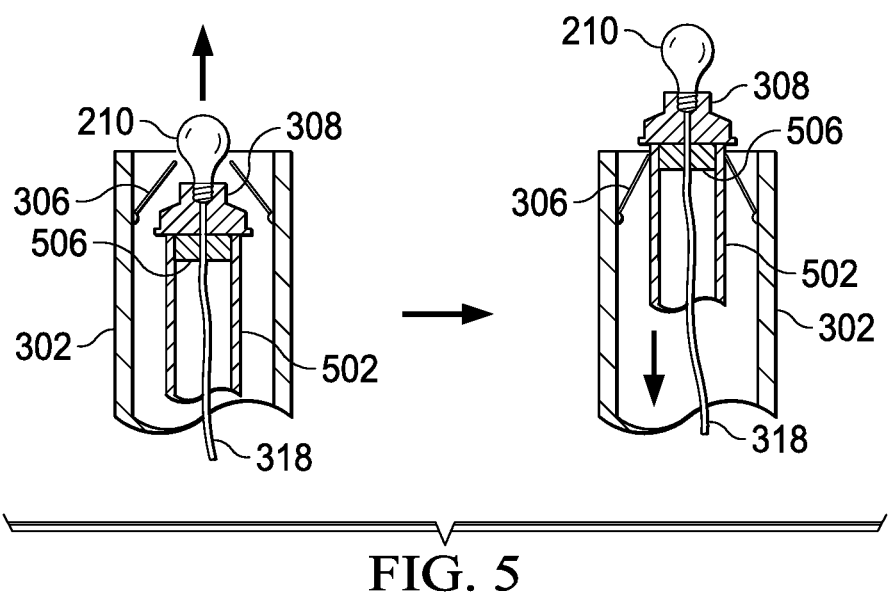
FIG. 5 illustrates a cross-sectional view of the apparatus for inserting a new bulb into the lamp device.

Referring to FIG. 5, there is illustrated diagrammatic detail of inserting a lamp holder 308 back into the housing 306. An insertion apparatus 502 is provided that is operable to be urged against the lower end of the lamp holder 308. There is a protrusion 506 that is disposed on the lower surface of the lamp holder 308 that is operable to be inserted into the insertion device. The insertion device 502 is operable to urge the lamp holder 308 upwards until it contacts the pivoting members 306 to urge them outward, and then the lamp holder 308 is urged above the distal edges of the pivoting members 306 such that they will pivot downward to contact the bottom surface of the lamp holder 308 such that, when the insertion device is pulled downward, the lamp holder 308 will remain within the housing 302 held upwards therein by the pivoting members 506 on the distal ends thereof.

Figure 6:
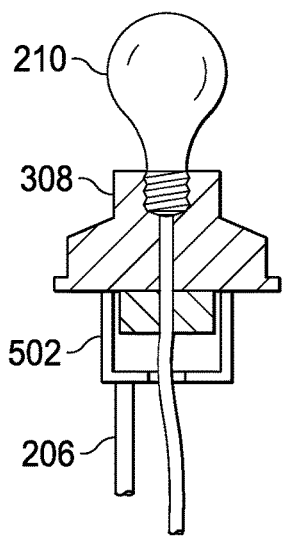
FIG. 6 illustrates a diagrammatic view of the insertion apparatus.

Referring now to FIG. 6, there is illustrated a diagrammatic view of the lamp holder 308 disposed on the insertion device 502. The flexible rod 206 (there being one flexible rod associated with the insertion device and one with the extraction device, but for simplicity purposes, the same numeral will be used for both) is attached to the bottom of the surface of the insertion device 502.

Figure 7:
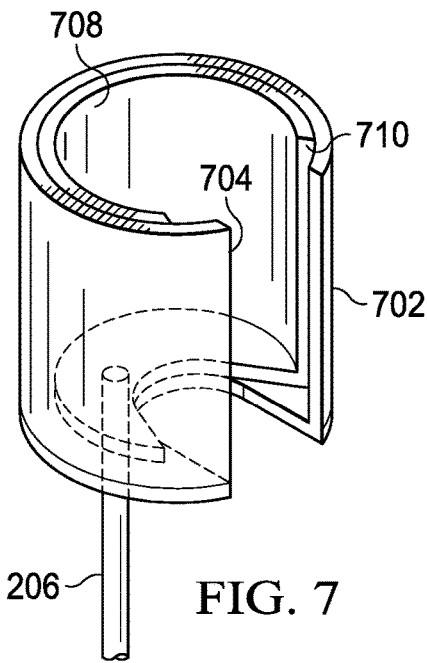
FIG. 7 illustrates a further perspective view of the insertion device.
Figure 8:
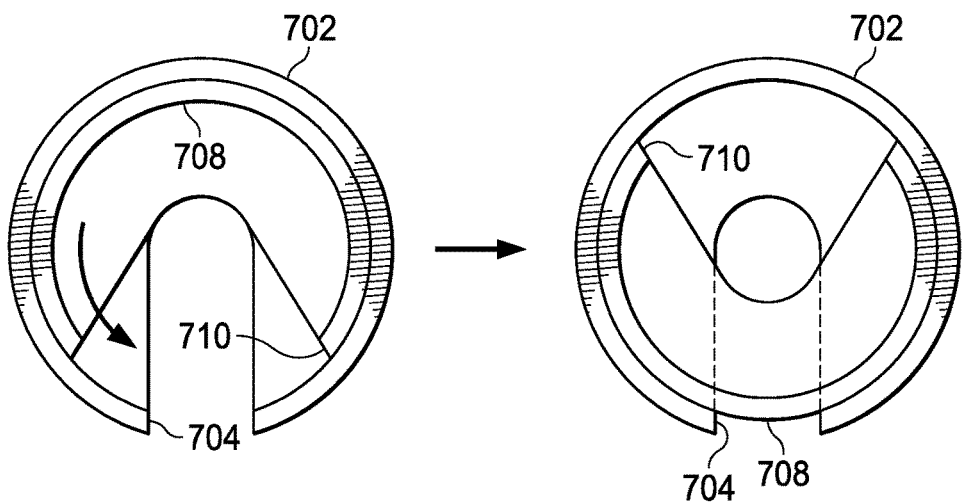
FIG. 8 illustrates a cross-sectional top view of the insertion device.

FIG. 7 illustrates a detail which shows that the insertion device is comprised of an outer cylindrical member 702 with a slot 704 disposed therein and an interior cylindrical member 708 with a slot 710 disposed therein. The interior cylindrical member 708 has an outer diameter that is substantially the same as the interior cylindrical diameter of the outer cylinder 702 such that, when it is rotated, the two slots 704 and 710 will oppose each other and they will enclose the wire, as illustrated in the detail of FIG. 8. The operation is to insert the wire through the insertion apparatus and then close the inner cylinder therearound, and then insert it upward until it contacts the base of the holder 308 with the protrusion 506 extending downward therein. The protrusion 506 can have a diameter that is almost the same as the inner diameter of the interior cylinder 708.

Figure 9:
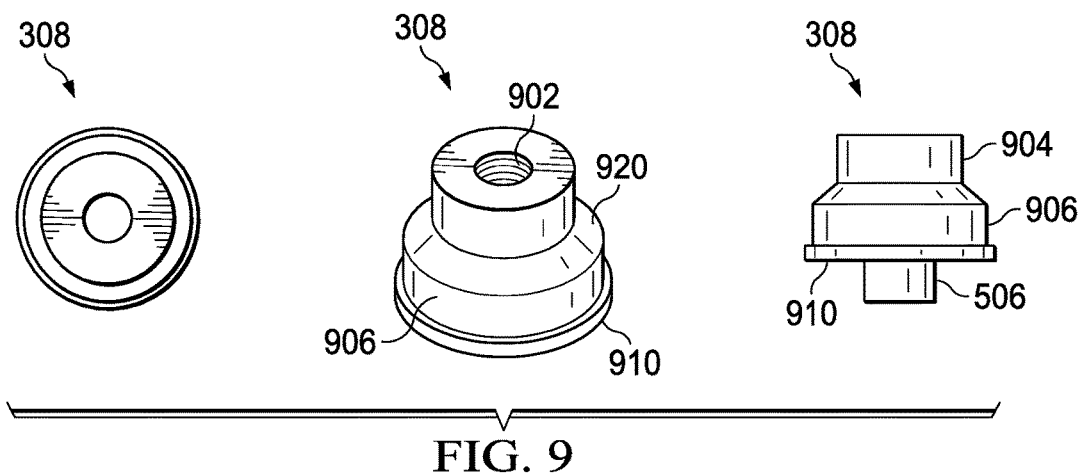
FIG. 9 illustrates a series of views for the bulb holder.

Referring now to FIG. 9, there is illustrated a series of views of the lamp holder 308. The lamp holder 308 has a receptacle 902 for the bulb 210 and an upper cylindrical surface 904 that is smaller than a lower cylindrical surface 906. The lower cylindrical surface is disposed on another flat thin surface having a diameter that is larger than the diameter of the lower cylindrical member 906, this being a cylindrical flat member 910. This member 910 provides an edge on the lower end thereof. There will be provided the protrusion 506 extending downward therefrom.

Figure 10A:
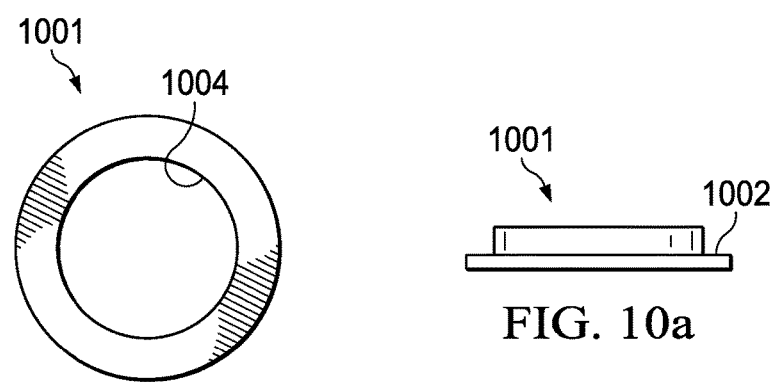
FIG. 10A illustrates a side view of the engaging ring.
Figure 10:
FIG. 10 illustrates multiple views of the engaging ring.
Figure 11:
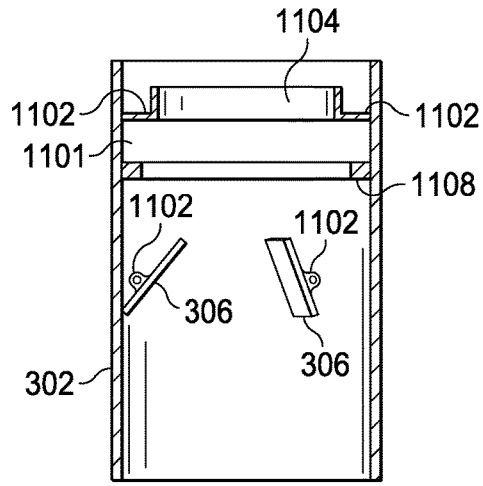
FIG. 11 illustrates multiple views of the actual apparatus stored on the top of the pole for containing the bulb holder after insertion or prior to extraction.
Figure 12:
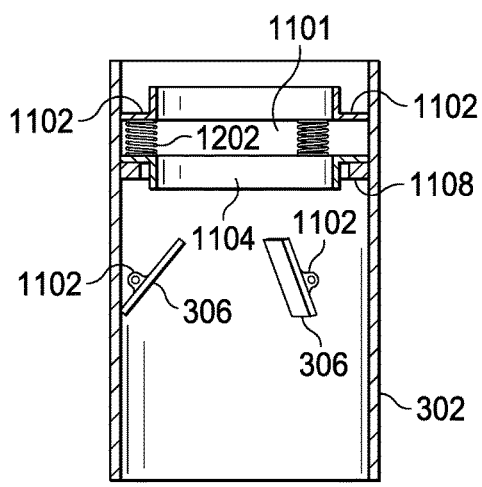
FIG. 12 illustrates multiple views of the housing that fits on the top of the pole.

Referring now to FIG. 10, there is illustrated a diagrammatic view of an engaging ring 1001 that is operable to be disposed in a cavity 1101 in the housing 302 illustrated in FIG. 11. This engaging ring has a lower outer ring 1002 that is substantially the same diameter as the interior of the housing 302 with a hole 1004 disposed therethrough and an upper cylindrical area therearound. The detail of FIG. 12 illustrates the interaction. The housing of FIG. 11 has an upper member 1102 disposed in the upper end thereof with an opening 1104 disposed therein. This is above the cavity 1101. The opening 1004 is operable to receive the lamp holder 308. There are also provided an extending ring 1108 that extends outward in an arcuate manner. This is operable to engage the outer edges of the surface 1002 of the engaging ring 1001. It can be seen that, in FIG. 12, the engaging ring 1001 is disposed within the cavity and held away from the surface 1006 by springs 1202. Therefore, it is urged downward.

Figure 13:
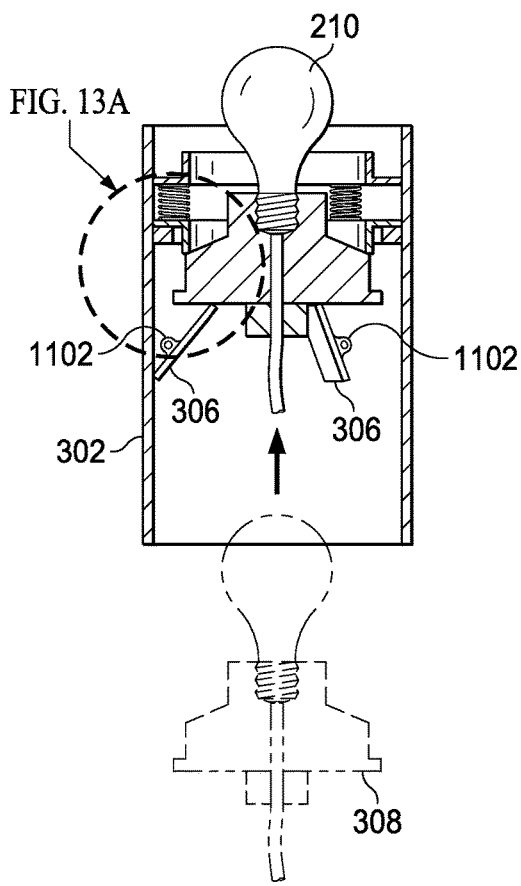
FIG. 13 illustrates a diagrammatic view of inserting the bulb into the holder.
Figure 13A:
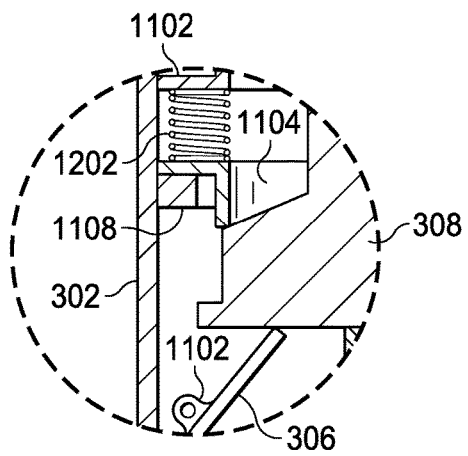
FIG. 13A illustrates another diagrammatic view of inserting the bulb into the holder.

When the lamp, as illustrated in FIG. 13, and the holder 308 are inserted upward therethrough, the pivoting members 306 disposed about a pivot point 1102 on the outer edges of the housing 302 are inserted upward, the pivoting member 306 will pivot outward and allow the lamp holder 308 to extend upward through the opening with the beveled surface, surface 920, between the upper cylindrical member 308 and the lower cylindrical member 906 of the lamp holder 308 will have a diameter approximately equal to the interior diameter of the hole 1004 in the engaging ring 1001. This will cause it to urge the engaging ring upward against the spring such that, when the insertion device is removed, the lamp holder will be urged downward against the distal ends of the pivoting devices 306. This is illustrated in a detail on FIG. 13A.

It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A system for replacing a bulb in a light fixture mounted on a light pole with a hollow core, comprising:
    a mobile lamp fixture for containing the bulb and interfaced with electrical wires that extend from a first point at a distal end of the light pole from the light fixture and extending through the hollow core to the light fixture, the mobile lamp fixture dimensioned to pass through the hollow core;
    a receiving fixture disposed and fixed on the light fixture, having:
        a releasing collar for releasably holding the mobile lamp fixture in place in the light fixture, the releasing collar operable in a first extracting mode to allow the mobile lamp fixture to be removed and extracted through the hollow core and, in an insertion mode, to receive and secure the mobile lamp fixture through the hollow core;
    wherein the releasing collar includes:
        a fixed collar disposed about the interior of the hollow core proximate the light fixture, and
        a spring biased receiving collar for interfacing with the fixed collar via a spring and urging the spring biased receiving collar away from the fixed collar toward the distal end of the light pole.

2. The system of claim 1, wherein the mobile lamp fixture includes:
    a supporting body;
    an electrical interface for receiving the bulb and interfacing the bulb with the electrical wires extending from the opposite side thereof from the bulb, and
    a supporting collar disposed about the periphery of the supporting body in a plane perpendicular to the axis of the hollow core of the pole.

3. The system of claim 2, wherein the releasing collar further includes:

a releasing member for interfacing with the mobile lamp fixture collar to allow the mobile lamp fixture to pass thereby in the insertion mode with an external insertion device and maintain it in contact with the spring biased receiving collar in a secured manner and to release the mobile lamp fixture in the extraction mode in response to an insertion device being inserted therein and interfaced there with to allow the mobile lamp fixture to be removed through the hollow core.

4. The system of claim 1, wherein the releasing collar further includes:
a releasing member for interfacing with the mobile lamp fixture collar to allow the mobile lamp fixture to pass thereby in the insertion mode with an external insertion device and maintain it in contact with the spring biased receiving collar in a secured manner and to release the mobile lamp fixture in the extraction mode in response to an insertion device being inserted therein and interfaced there with to allow the mobile lamp fixture to be removed through the hollow core.

5. The system of claim 1 and further comprising an extracting device for securely interfacing with the mobile lamp fixture through the hollow core to place the receiving fixture in the extracting mode and to remove the mobile lamp fixture from the receiving fixture and extracting the mobile lamp fixture through the hollow core along with the electrical wires attached thereto.

6. The system of claim 1, and further comprising an insertion device for securely interfacing with the mobile lamp fixture proximate the distal end of the pole and inserting the mobile lamp fixture through the hollow core from the distal end of the light pole toward the light fixture and into the receiving fixture in the insertion mode and causing the mobile lamp fixture to be secured within the receiving fixture.

7. The system of claim 1, and further comprising:
an extracting device for securely interfacing with the mobile lamp fixture through the hollow core to place the receiving fixture in the extracting mode and to remove the mobile lamp fixture from the receiving fixture and extracting the mobile lamp fixture through the hollow core along with the electrical wires attached thereto; and
an insertion device for securely interfacing with the mobile lamp fixture proximate the distal end of the light pole and inserting the mobile lamp fixture through the hollow core from the distal end of the light pole toward the light fixture and into the receiving fixture in the insertion mode and causing the mobile lamp fixture to be secured with in the receiving fixture.

8. The system of claim 1, wherein:
an external extracting device comprises a device for securely interfacing with the mobile lamp fixture through the hollow core to place the receiving fixture in the extracting mode and to remove the mobile lamp fixture from the receiving fixture and extracting the mobile lamp fixture through the hollow core along with the electrical wires attached thereto; and
an external insertion device comprises a device for securely interfacing with the mobile lamp fixture proximate the distal end of the light pole and inserting the mobile lamp fixture through the hollow core from the distal end of the light pole toward the light fixture and into the receiving fixture in the insertion mode and causing the mobile lamp fixture to be secured with in the receiving fixture.

9. The system of claim 8, wherein the external insertion device comprises:
an insertion pole for extending upward through the hollow core of the light pole and having a length at least as long as the light pole; and
a cylindrical supporting body having a cylindrical shape with a slot disposed along the length of the wall thereof and dimensioned to receive the electrical wires the, the diameter of the supporting body less than the diameter of the supporting body of the mobile lamp fixture, the supporting body of the mobile lamp fixture having a receiving recess therein for receiving the upper surface of the cylindrical supporting body such that the cylindrical supporting body can be disposed therein on the end thereof;
the insertion pole interfacing with the opposite side of the cylindrical supporting body from the supporting body of the mobile lamp fixture on one side thereof.

10. The system of claim 9, and further comprising an inner semi-cylindrical body for slidably moving about the interior surface of the cylindrical supporting body to seal the slot after the cylindrical supporting body has been interfaced with the supporting body of the mobile lamp fixture.

11. The system of claim 8, wherein the external extraction device comprises:
an extraction pole for extending upward through the hollow core of the light pole and having a length at least as long as the light pole;
a cylindrical container having a cylindrical shape with cylindrical sidewalls and a bottom end surface that is partially closed and an open upper end, the diameter of cylindrical container greater than the diameter of the supporting body of the mobile lamp fixture for receiving the supporting body of the mobile lamp fixture, the cylindrical container having a slot in the cylindrical wall thereof and extending to the bottom in surface to interface with an opening in the bottom and surface such that the supporting body of the mobile lamp fixture can be received therein and the electrical wires can be disposed through the slot and through the open portion on the bottom and surface; and
the one end of the extraction pole interfacing with the bottom end surface of the cylindrical container and secured thereto, where in the cylindrical container has a diameter that is operable to interface with the releasing member in the extraction mode to cause it to release the supporting body of the mobile lamp fixture.

12. A method for changing a light bulb in a parking light pole, comprising the steps of:
disposing a housing on the top of a light pole for holding a lamp holder having a lamp disposed therein;
holding the lamp holder in the housing by urging the lamp holder downward with springs against upper edges of a plurality of pivoting members that interface with a bottom surface of the lamp holder;
removing the lamp holder by the steps of:
urging a removal apparatus up through an annulus in the center of the light pole to urge the plurality of pivoting members outward and away from the bottom surface of the lamp holder to allow the lamp holder to fall and be captured by the removal apparatus, and
pulling the removal apparatus downward through the annulus with the lamp holder.

13. The method of claim 12, further comprising:
replacing the lamp holder by the steps of:
disposing the lamp holder in an installation device, and urging the installation device upward such that the lamp holder causes the pivoting members to urge outward, the diameter of the installation device such that the pivoting members can return to their normal position without interference from the installation device, after the pivoting members in the pivoted outward position are passed upward by the lamp holder, the pivoting members will pivot back to the normal position, urging the installation device down in the annulus to allow the lamp holder to be urged downward by the springs against the pivoting members, and removing the installation device.

14. A method for changing a light bulb in a parking light pole, comprising the steps of:

replacing a lamp holder by the steps of:

disposing the lamp holder in an installation device, and urging the installation device upward such that the lamp holder causes a plurality of pivoting members to urge outward, the diameter of the installation device such that the pivoting members can return to their normal position without interference from the installation device, after the pivoting members in the pivoted outward position are passed upward by the lamp holder, the pivoting members will pivot back to the normal position, urging the installation device down in an annulus to allow the lamp holder to be urged downward by springs against the pivoting members, and removing the installation device.

\* \* \* \* \*